J. S. ELLIOTT.
MILK-COOLERS.

No. 195,111. Patented Sept. 11, 1877.

Attest:
H. L. Perrin
J. A. Rutherford

John Smith Elliott.
Inventor.
By James L. Norris,
Atty.

UNITED STATES PATENT OFFICE.

JOHN SMITH ELLIOTT, OF TROUT RIVER LINES, NEW YORK.

IMPROVEMENT IN MILK-COOLERS.

Specification forming part of Letters Patent No. 195,111, dated September 11, 1877; application filed August 18, 1877.

*To all whom it may concern:*

Be it known that I, JOHN SMITH ELLIOTT, of Trout River Lines, in the county of Franklin and State of New York, have invented certain new and useful Improvements in Milk-Coolers, of which the following is a specification:

This invention relates to an improved apparatus for cooling liquids, but is especially adapted to cooling milk and cream; and it consists in the combination, with a vessel and a series of longitudinal pipes opening through the ends of said vessel, of metallic connections or boxes secured to the exterior of the vessel, and alternately connecting the opposite ends of the pipes, as will be more fully hereinafter set forth.

Figure 1:
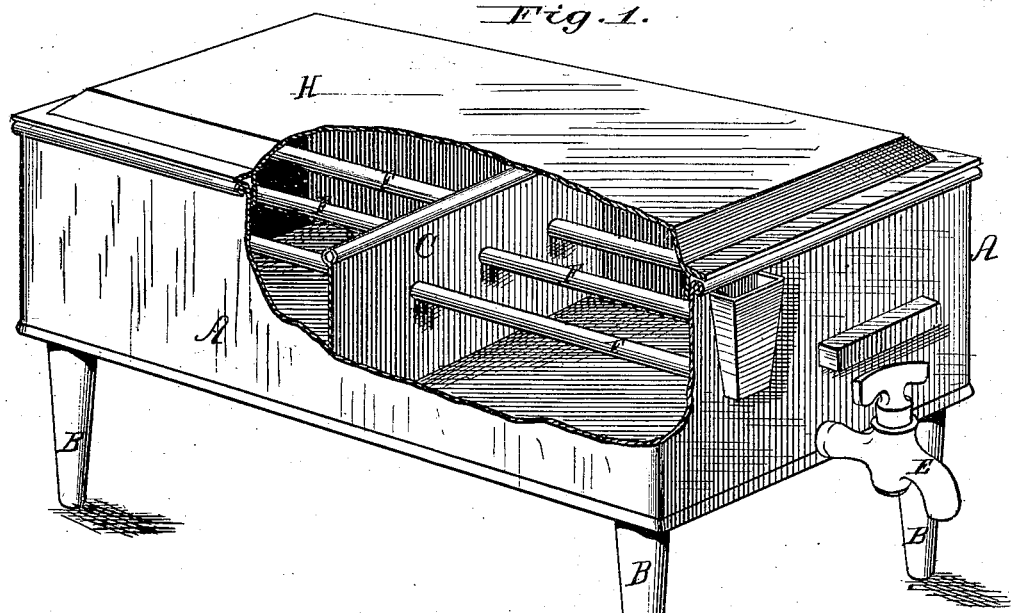
Figure 2:
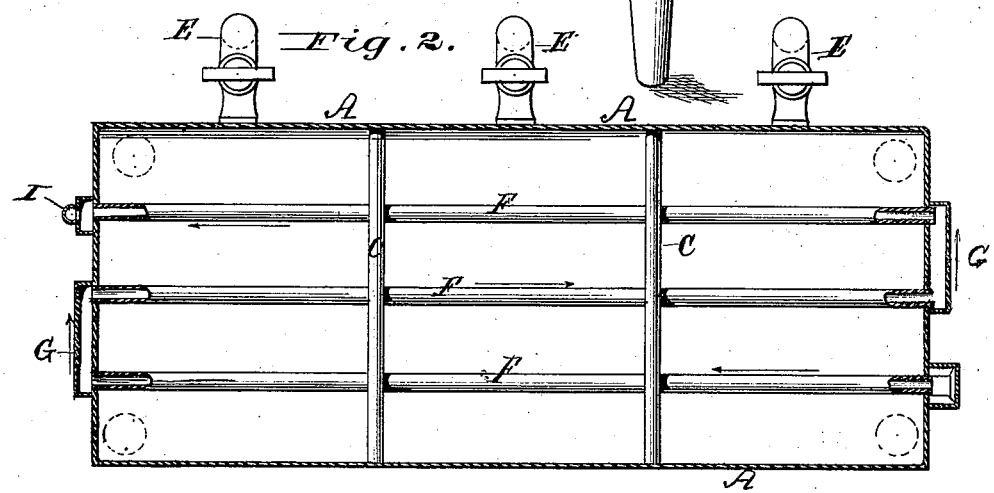
Figure 3:
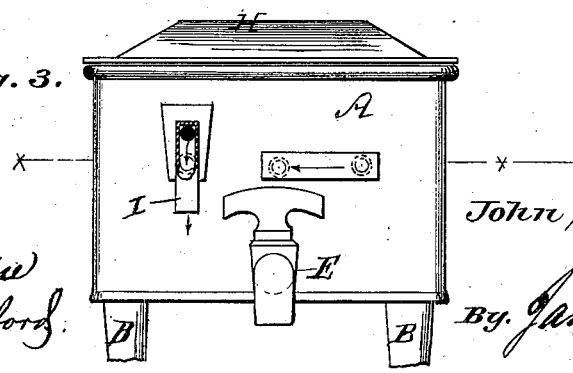

In the drawing, Figure 1 represents a perspective view, broken away to show the interior of my milk-cooler; Fig. 2, a horizontal transverse section of the vessel, and Fig. 3 an end elevation.

The letter A represents a vessel, of rectangular or other convenient shape, constructed of metal, wood, or other suitable material, and mounted on the legs B. Said vessel is preferably divided into two or more compartments by means of a partition, or a series of partitions, C, each partition being provided with a faucet, E, on the outside, for drawing off the contents.

The letter F represents a series of one or more tubes, extending longitudinally through the upper part of the vessel, and connected together alternately at the opposite ends of the vessel, on the outside of the same, with the exception of the first and final tubes of the series, one of which is provided with a funnel for introducing water, and the other left open for the escape of the same.

The vessel A is preferably constructed of sheet metal, and the connections for the pipes on the outside formed by means of rectangular sections G, closed at the ends but open at the sides, said sections being secured directly over the open ends of the tubes by soldering or otherwise, thus making the wall of the vessel from one side of the tube formed by said sections, thus gaining the advantage of the cooling-surface thus added to the vessel.

When a series of partitions are employed, the stop-cocks may be placed along the sides of the vessel, instead of at the ends, as shown in Fig. 2.

The funnel may also be formed similarly to the connections G—that is to say, with one side formed by the wall of the vessel—for the same purpose; and at the delivery end of the tubes may be formed a box-like escape-chamber, I, to further increase the cooling-surface.

The vessel is provided with a cover, H, which may be secured as shown in the drawing, or hinged, or otherwise attached to said vessel, if deemed preferable.

The operation of my apparatus will be readily understood in connection with the above description. The milk or cream to be cooled is placed in one or more of the compartments, according to the quantity, until it covers the cooling-tubes, after which the vessel is closed, and running water from a convenient source is allowed to enter the funnel and flow through the tubes until the cream is of the desired temperature.

The apparatus, as thus constructed, furnishes a convenient and simple means for cooling milk or cream, and, owing to the peculiar position of the tubes, and the manner of connecting the same at the ends, is not liable to get out of order; and, although the tubes are permanently secured within the vessel and form part of the same, their position is such that no difficulty will be experienced in cleaning the compartments.

What I claim, and desire to secure by Letters Patent, is—

In combination with the vessel A and series of longitudinal pipes F opening through the ends of the vessels, the metallic connections or boxes G, secured to the exterior of the vessel and alternately connecting the opposite ends of said pipes, substantially as and for the purpose described.

In testimony that I claim the foregoing I have hereunto set my hand in the presence of the subscribing witnesses.

JOHN S. ELLIOTT.

Witnesses:
 W. W. GAY,
 W. M. HOLBROOK.